United States Patent
Tanaka et al.

(10) Patent No.: US 12,359,640 B2
(45) Date of Patent: Jul. 15, 2025

(54) ENGINE CONTROL DEVICE AND ENGINE CONTROL METHOD

(71) Applicant: MITSUBISHI HEAVY INDUSTRIES ENGINE & TURBOCHARGER, LTD., Sagamihara (JP)

(72) Inventors: Kengo Tanaka, Tokyo (JP); Yusuke Imamori, Tokyo (JP); Sota Watanabe, Sagamihara (JP); Taro Tamura, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/707,624

(22) PCT Filed: Oct. 19, 2022

(86) PCT No.: PCT/JP2022/038870
§ 371 (c)(1),
(2) Date: May 6, 2024

(87) PCT Pub. No.: WO2023/085018
PCT Pub. Date: May 19, 2023

(65) Prior Publication Data
US 2025/0003373 A1  Jan. 2, 2025

(30) Foreign Application Priority Data
Nov. 10, 2021 (JP) ................. 2021-183714

(51) Int. Cl.
*F02D 41/40* (2006.01)
*F02D 41/00* (2006.01)

(52) U.S. Cl.
CPC ....... *F02D 41/401* (2013.01); *F02D 41/0097* (2013.01); *F02D 2200/0406* (2013.01); *F02D 2200/0614* (2013.01); *F02D 2200/101* (2013.01)

(58) Field of Classification Search
CPC ............. F02D 41/0097; F02D 41/401; F02D 2200/0406; F02D 2200/0614; F02D 2200/101
See application file for complete search history.

(56) References Cited

U.S. PATENT DOCUMENTS

| 5,996,552 A | 12/1999 | Iijima et al. |
| 2002/0129789 A1 | 9/2002 | Furukawa et al. |
| 2009/0107456 A1 | 4/2009 | Pallett et al. |

FOREIGN PATENT DOCUMENTS

| JP | 61-167132 A | 7/1986 |
| JP | 9-114483 A | 5/1997 |

(Continued)

OTHER PUBLICATIONS

International Preliminary Report on Patentability and Written Opinion of the International Searching Authority for International Application No. PCT/JP2022/038870, dated May 23, 2024, with English translation.

(Continued)

*Primary Examiner* — Audrey B. Walter
(74) *Attorney, Agent, or Firm* — Birch, Stewart, Kolasch & Birch, LLP

(57) ABSTRACT

In this engine control device for controlling an engine with a turbocharger, a rotation speed increase mode includes at least one stage of fuel injection in one combustion cycle of the engine, a high-idle mode includes at least two stages of fuel injection in one combustion cycle of the engine, and a high-idle mode execution unit is configured to retard the timing of the second stage fuel injection in one combustion (Continued)

cycle of the engine in the high-idle mode, relative to the timing of the first stage fuel injection in one combustion cycle of the engine in the rotation speed increase mode.

11 Claims, 13 Drawing Sheets

(56) References Cited

FOREIGN PATENT DOCUMENTS

| | | |
|---|---|---|
| JP | 10-288057 A | 10/1998 |
| JP | 2009-104598 A | 4/2000 |
| JP | 2001-193463 A | 7/2001 |
| JP | 2002-339764 A | 11/2002 |
| JP | 2005-76618 A | 3/2005 |

OTHER PUBLICATIONS

Extended European Search Report issued for European Application No. 22892518.6 on Dec. 9, 2024.

ENGINE CONTROL DEVICE AND ENGINE CONTROL METHOD

TECHNICAL FIELD

The present disclosure relates to an engine control device and an engine control method.

The present application claims priority based on Japanese Patent Application No. 2021-183714 filed in Japan on Nov. 10, 2021, the contents of which are incorporated herein by reference.

BACKGROUND ART

For example, in an engine for power generation, an extremely rapid power supply is particularly required. Therefore, load application performance is emphasized. In order to improve the load application performance, it is necessary to quickly operate a turbocharger. Therefore, for example, as disclosed in PTL 1, the following method is known. The turbocharger is quickly operated in such a manner that exhaust energy of an engine is increased by retarding (delaying) a fuel injection timing (retarded) during high-idle before a load is applied to a diesel engine.

CITATION LIST

Patent Literature

[PTL 1] Japanese Unexamined Patent Application Publication No. H10-288057

SUMMARY OF INVENTION

Technical Problem

However, when the fuel injection timing is excessively retarded during high-idle, combustion becomes unstable, and a large amount of HC is discharged to generate white smoke. Therefore, there is a concern about an environmental impact. Therefore, a retard amount of the fuel injection timing is limited, and an effect of improving the load application performance by adjusting the retard amount of the fuel injection timing is limited.

In view of the above-described circumstances, at least one embodiment of the present disclosure aims to provide an engine control device and an engine control method which can realize satisfactory load application performance while suppressing an increase in a discharge amount of HC.

Solution to Problem

According to at least one embodiment of the present disclosure, in order to achieve the above-described object, there is provided an engine control device.

An engine control device for controlling an engine with a turbocharger includes a rotation speed increase mode execution unit configured to execute a rotation speed increase mode which is a mode for increasing a rotation speed of the engine while operating the engine with no load, a high-idle mode execution unit configured to execute a high-idle mode for operating the engine with no load, which is different from the rotation speed increase mode, when a first parameter relating to an operation state of the engine reaches a threshold value in the rotation speed increase mode, and a load application mode execution unit configured to execute a load application mode which is a mode for applying a load to the engine, after the high-idle mode is executed.

The rotation speed increase mode includes at least one stage of fuel injection in one combustion cycle of the engine.

The high-idle mode includes at least two stages of fuel injection in the one combustion cycle of the engine.

The high-idle mode execution unit is configured to retard a timing of second stage fuel injection in the one combustion cycle of the engine in the high-idle mode, relative to a timing of first stage fuel injection in the one combustion cycle of the engine in the rotation speed increase mode.

In addition, according to at least one embodiment of the present disclosure, in order to achieve the above-described object, there is provided an engine control method.

An engine control method for controlling an engine with a turbocharger includes a rotation speed increase mode execution step of executing a rotation speed increase mode which is a mode for increasing a rotation speed of the engine while operating the engine with no load, a high-idle mode execution step of executing a high-idle mode for operating the engine with no load, which is different from the rotation speed increase mode, when a first parameter relating to an operation state of the engine reaches a threshold value in the rotation speed increase mode, and a load application mode execution step of executing a load application mode which is a mode for applying a load to the engine, after the high-idle mode is executed.

The rotation speed increase mode includes at least one stage of fuel injection in one combustion cycle of the engine.

The high-idle mode includes at least two stages of fuel injection in the one combustion cycle of the engine.

In the high-idle mode execution step, a timing of second stage fuel injection in one combustion cycle of the engine in the high-idle mode is retarded, relative to a timing of first stage fuel injection in the one combustion cycle of the engine in the rotation speed increase mode.

According to at least one embodiment of the present disclosure, in order to achieve the above-described object, there is provided an engine control device.

An engine control device for controlling an engine with a turbocharger includes a rotation speed increase mode execution unit configured to execute a rotation speed increase mode which is a mode for increasing a rotation speed of the engine while operating the engine with no load, a high-idle mode execution unit configured to execute a high-idle mode for operating the engine with no load, which is different from the rotation speed increase mode, when a first parameter relating to an operation state of the engine reaches a threshold value, and a load application mode execution unit configured to execute a load application mode which is a mode for applying a load to the engine, after the high-idle mode is executed.

The high-idle mode execution unit is configured to adjust a timing of fuel injection in one combustion cycle of the engine in the high-idle mode so that a second parameter relating to an operation state of the engine falls within a target range.

Advantageous Effects of Invention

According to at least one embodiment of the present disclosure, there are provided an engine control device and an engine control method which can realize satisfactory load application performance while suppressing an increase in a discharge amount of HC.

DESCRIPTION OF EMBODIMENTS

Figure 1:
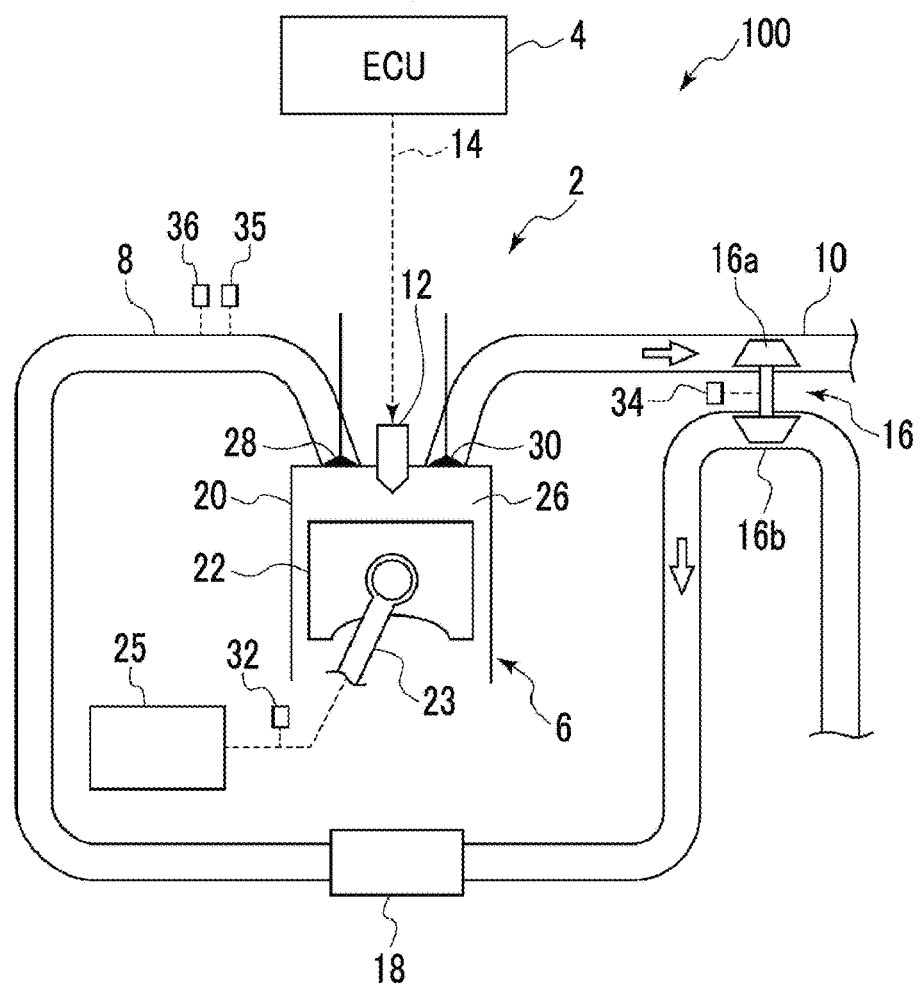
FIG. 1 is a view schematically illustrating a schematic configuration of a diesel engine system 100 according to an embodiment.

Hereinafter, some embodiments of the present disclosure will be described with reference to the accompanying drawings. Dimensions, materials, shapes, relative arrangements, and the like of components described as embodiments or illustrated in the drawings are not intended to limit the scope of the invention, but are merely explanatory examples.

For example, expressions representing relative or absolute dispositions such as "in a certain direction", "along a certain direction", "parallel", "orthogonal", "center", "concentric", or "coaxial" not only strictly represent the dispositions, but also represent a state where the dispositions are relatively displaced with a tolerance or at an angle or a distance to such an extent that the same function can be obtained.

For example, expressions representing that things are in an equal state such as "same", "equal", and "homogeneous" not only strictly represent an equal state, but also represent a state where a difference exists with a tolerance or to such an extent that the same function can be obtained.

For example, expressions representing shapes such as a quadrangular shape and a cylindrical shape not only represent shapes such as quadrangular shape and a cylindrical shape in a geometrically strict sense, but also represent shapes including an uneven portion or a chamfered portion within a range where the same effect can be obtained.

In addition, expressions of "being provided with", "being equipped with", "including", or "having" one component are not exclusive expressions excluding the presence of other components.

FIG. 1 is a view schematically illustrating a schematic configuration of a diesel engine system 100 according to an embodiment.

As illustrated in FIG. 1, the diesel engine system 100 includes a diesel engine with a turbocharger 2 (hereinafter, simply referred to as an engine 2) and an engine control unit (ECU) 4 as a control device for controlling the engine 2. For example, the engine 2 is an engine for power generation, and rotational energy generated by the engine 2 is converted into electric power by a generator 25.

As illustrated in FIG. 1, the engine 2 includes an engine body 6 configured to generate power by internally combusting a fuel, an inlet line 8 for compressing inlet air (gas, for example, air) and supplying the air to the engine body 6, an exhaust line 10 for guiding exhaust discharged from the engine body 6 to an outside of the engine 2, a fuel injection device (fuel injector) 12 configured to inject a liquid fuel into the engine body 6, a turbocharger 16, and an intercooler 18. In addition, the engine 2 includes a engine rotation speed meter 32 that measures a rotation speed N1 of the engine 2, a turbocharger rotation speed meter 34 that measures a rotation speed N2 of the turbocharger 16, an inlet air temperature sensor 35 for measuring an inlet air temperature Ts (in an illustrated example, a rear temperature of the intercooler 18 in the inlet line 8) which is an inlet air temperature of the engine 2, and an inlet air pressure sensor 36 for measuring an inlet air pressure Ps (in an illustrated example, a rear pressure of the intercooler 18 in the inlet line 8) which is an inlet air pressure of the engine 2.

The turbocharger 16 includes an exhaust turbine 16a provided in the exhaust line 10 and a compressor 16b connected to the exhaust turbine 16a via a rotary shaft and provided in the inlet line 8. When the exhaust of the engine body 6 is supplied to the exhaust turbine 16a via the exhaust line 10, the exhaust turbine 16a rotates. Consequently, the compressor 16b connected to the exhaust turbine 16a via the rotary shaft compresses the air flowing through the inlet line 8, and supplies the air to the engine body 6. The air compressed by the compressor 16b of the turbocharger 16 is cooled by the intercooler 18, and is supplied to the engine body 6.

The engine body 6 includes at least one cylinder 20, and at least one piston 22 accommodated inside the at least one cylinder 20 so that each can reciprocate along an axial direction. The engine body 6 internally has a combustion chamber 26 partitioned by the cylinder 20 and the piston 22. In the engine body 6, the piston 22 compresses and heats the gas supplied from the inlet line 8 to the combustion chamber 26 through an inlet valve 28 to an ignition point or higher of the liquid fuel. The liquid fuel is self-ignited in such a manner that the liquid fuel from the fuel injection device 12 injected into the compressed and heated gas in accordance with a fuel injection command 14 from the ECU 4. The piston 22 is pushed out by expansion of a combustion gas generated by the self-ignition. Then, the reciprocating motion of the piston 22 is converted into a rotational force (power) by a crank shaft (not illustrated) via a connecting rod 23, and the rotational force of the crank shaft is transmitted to the generator 25, and is converted into electric power by the generator 25. The combustion gas in the combustion chamber 26 is discharged from the combustion chamber 26 through an exhaust valve 30, and is guided to the exhaust turbine 16a of the turbocharger 16 via the exhaust line 10.

Figure 2:
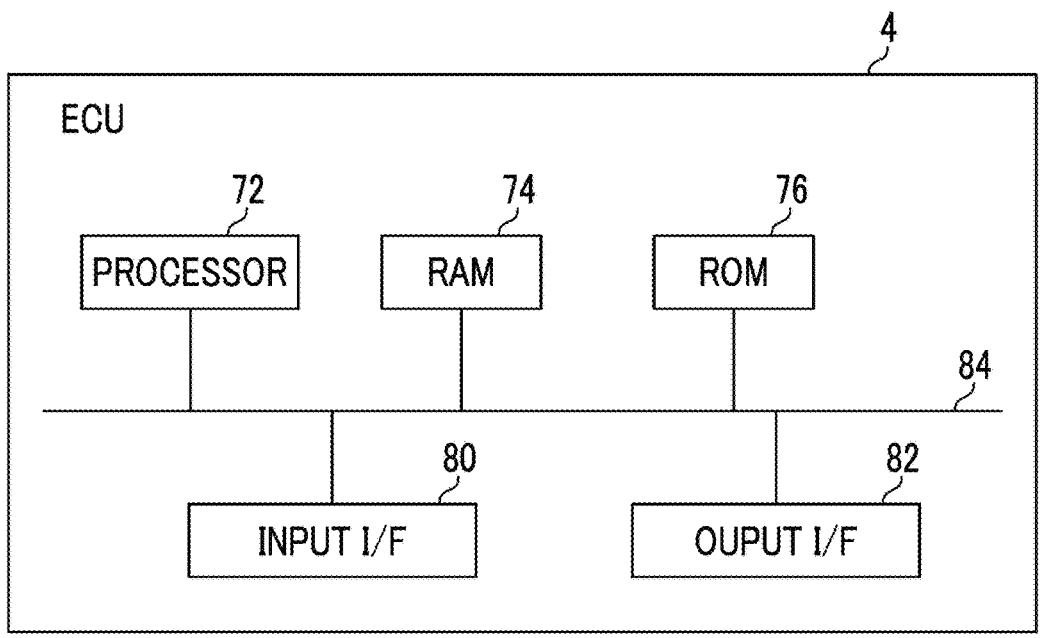
FIG. 2 is a view illustrating an example of a hardware configuration of an ECU 4 according to the embodiment.

FIG. 2 is a view illustrating an example of a hardware configuration of the ECU 4 according to the embodiment.

As illustrated in FIG. 2, for example, the ECU 4 includes a processor 72, a random access memory (RAM) 74, a read only memory (ROM) 76, an input I/F 80, and an output I/F 82, and is configured to use a computer in which all of these are connected to each other via a bus 84. The hardware configuration of the ECU 4 is not limited to the above-described example, and may be configured by a combination of a control circuit and a storage device. In addition, the ECU 4 is configured in such a manner that a computer executes a program for realizing each function of the ECU 4. For example, a function of each part in the ECU 4 described below is realized in such a manner that a program held in the ROM 76 is loaded into the RAM 74, the program is executed by the processor 72, and data in the RAM 74 or the ROM 76 is read and written.

Figure 3:
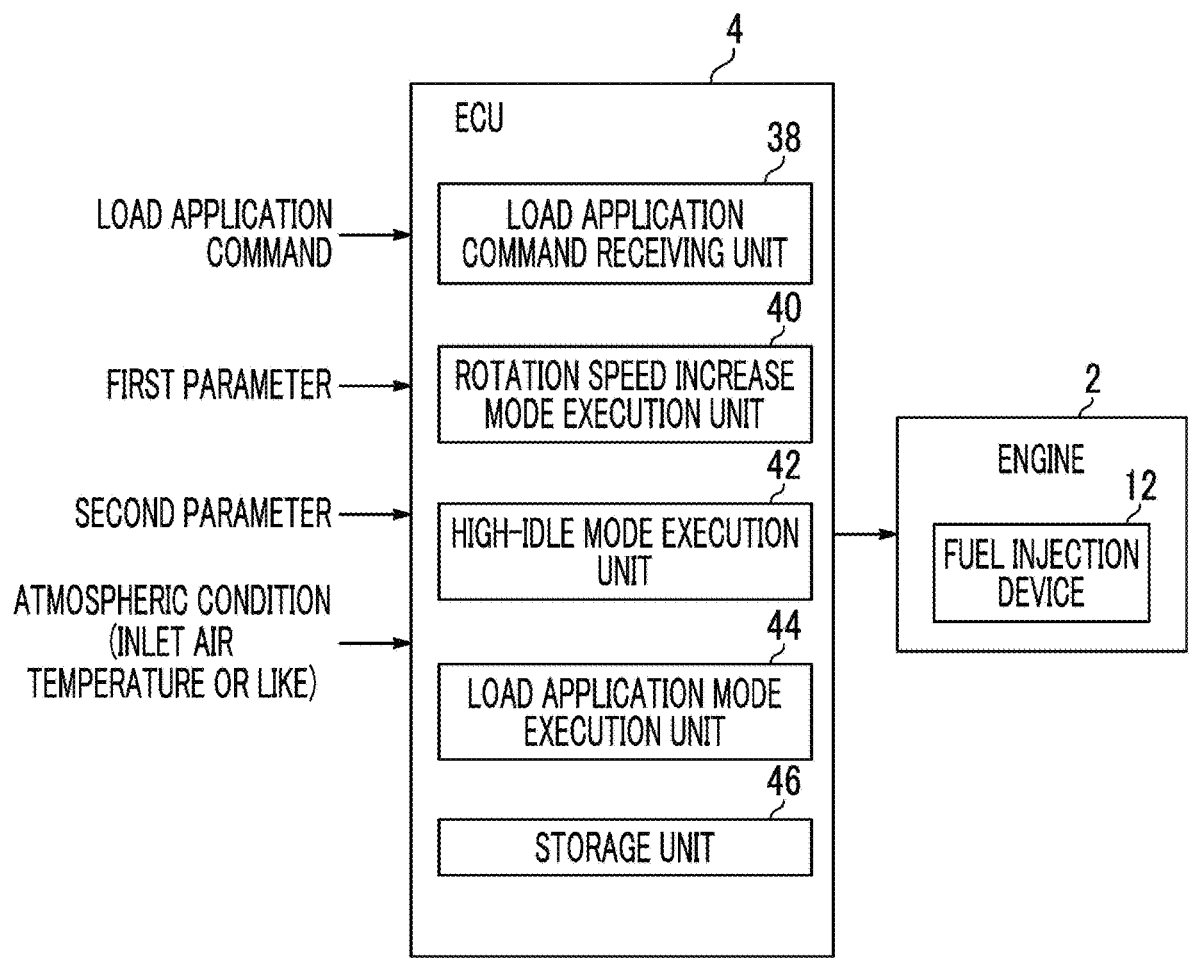
FIG. 3 is a block diagram illustrating an example of a functional configuration of the ECU 4 illustrated in FIGS. 1 and 2.
Figure 4:
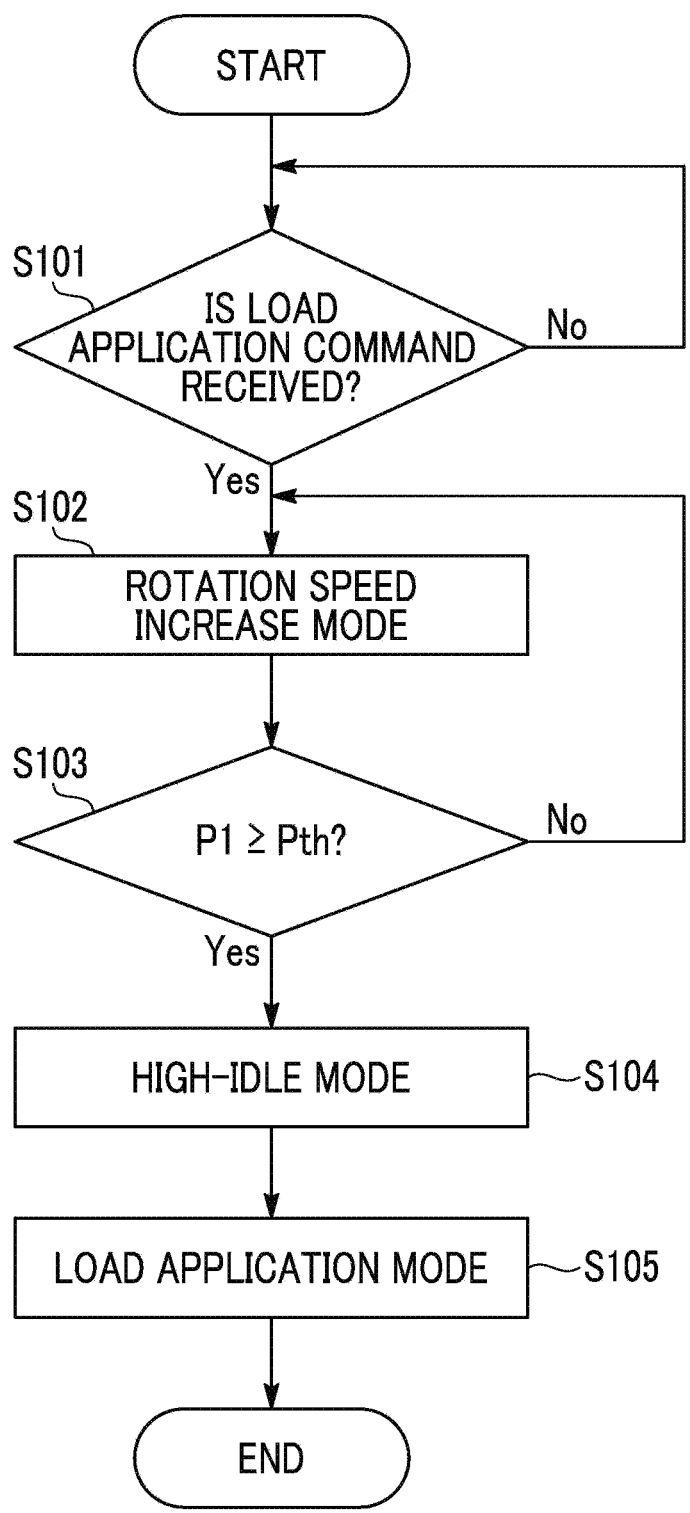
FIG. 4 is a view illustrating an outline of a load application flow in which a load is applied to an engine 2 by the ECU 4 illustrated in FIG. 3.
Figure 5:
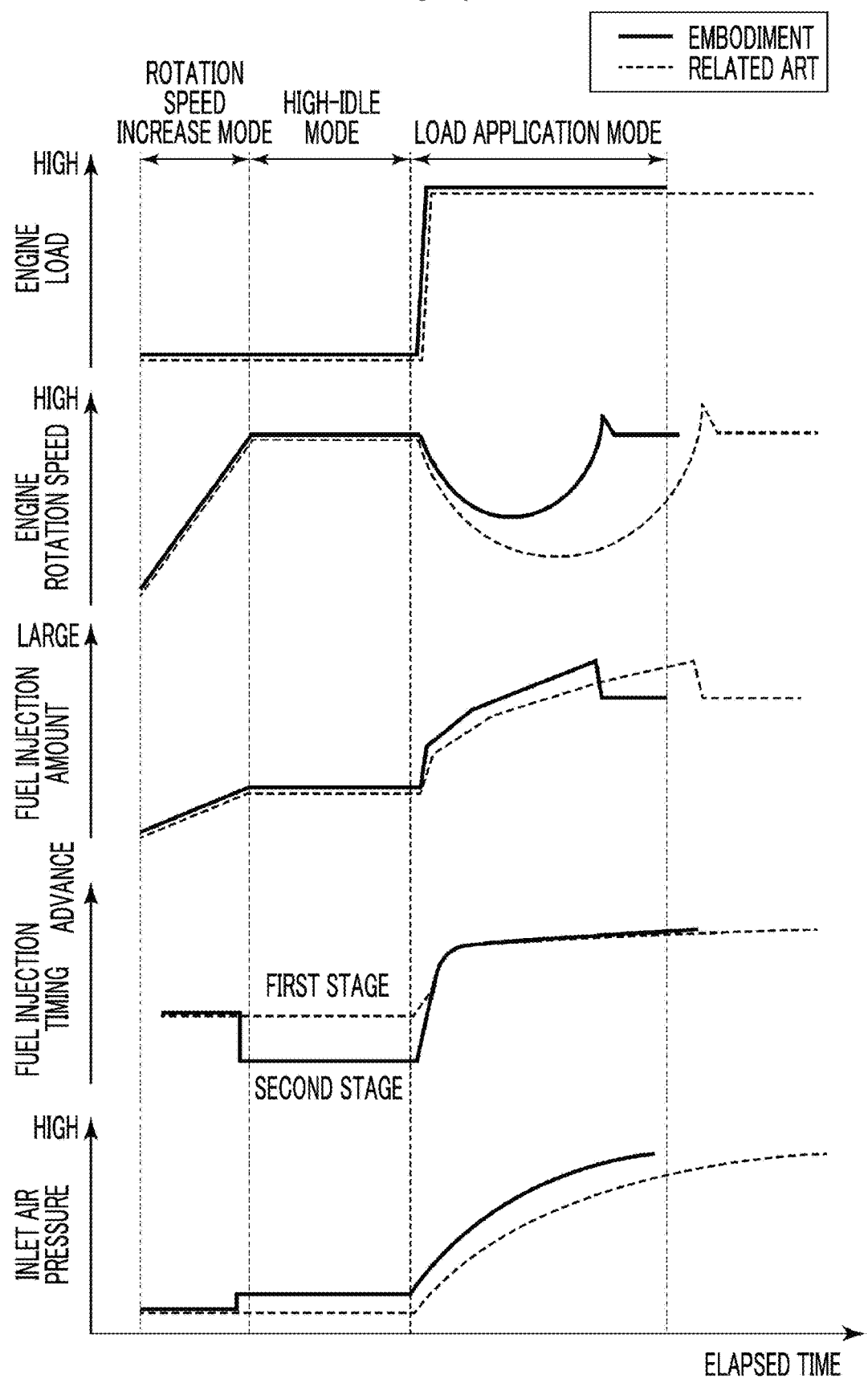
FIG. 5 is a view illustrating an engine operation state by controlling a load application flow illustrated in FIG. 4.

FIG. 3 is a block diagram illustrating an example of a functional configuration of the ECU 4 illustrated in FIGS. 1 and 2. FIG. 4 is a view illustrating an example of a load application flow in which a load is applied to the engine 2 by the ECU 4 illustrated in FIG. 3. FIG. 5 is a view illustrating details of control of the load application flow illustrated in FIG. 4. FIG. 5 illustrates a relationship between an elapsed time and an engine load, a relationship between the elapsed time and an engine rotation speed, a relationship between the elapsed time and a fuel injection amount, a relationship between the elapsed time and a fuel injection timing, and a relationship between the elapsed time and an inlet air pressure, and a horizontal axis (elapsed time) illustrated in FIG. 5 is common to each of the above-described relationships. In FIG. 5, a solid line indicates the embodiment described below, and a broken line indicates control of the load application flow in the related art (control for performing one stage (one time) of fuel injection during one combustion cycle in the high-idle mode).

As illustrated in FIG. 3, the ECU 4 includes a load application command receiving unit 38, a rotation speed increase mode execution unit 40, a high-idle mode execution unit 42, a load application mode execution unit 44, and a storage unit 46. The rotation speed increase mode execution unit 40, the high-idle mode execution unit 42, and the load application mode execution unit 44 are main units that respectively execute a rotation speed increase mode, a high-idle mode, and a load application mode which are described below. Meanwhile, for example, a main unit that determines a schedule for executing each of the modes may be a control device (for example, a control device that controls the generator 25) different from the ECU 4. That is, the ECU 4 may execute each of the above-described modes, based on a command indicating a schedule for executing each of the above-described modes received from the control device different from the ECU 4 (for example, a control device that controls the generator 25). For example, when the engine 2 is an engine for power generation, the above-described "control device different from the ECU 4" may be a control device that controls the generator 25. That is, the ECU 4 may execute each of the above-described modes, based on a command indicating a schedule for executing each of the above-described modes received from the control device that controls the generator 25.

As illustrated in FIG. 4, in S101, the load application command receiving unit 38 determines whether or not a load application command which is a command (request) to apply a load to the engine 2 is received from the outside of the ECU 4 (for example, a control device that controls the generator 25). When the load application command receiving unit 38 determines that the load application command is not received in S101, the load application command receiving unit 38 waits until the load application command is received. When the load application command receiving unit 38 determines that the load application command is received in S101, in S102, the rotation speed increase mode execution unit 40 executes the rotation speed increase mode (refer to FIG. 5) which is a mode for increasing the rotation speed of the engine 2 while operating the engine 2 with no load. The description "applying the load to the engine 2" herein means that an initial load (initial load from the generator 25 in a configuration illustrated in FIG. 1) is applied to the engine 2 in a state where the engine 2 has no load. In addition, when the load application command receiving unit 38 receives the load application command in S101, the ECU 4 may execute a low-idle mode for operating the engine 2 for a certain period of time with no load and at a predetermined rotation speed (low-idle rotation speed) before executing the rotation speed increase mode is executed.

As illustrated in FIG. 5, in the rotation speed increase mode, while operating the engine 2 with no load, over the time, the rotation speed increase mode execution unit 40 increases the fuel injection amount F which is the amount of the fuel injected by the fuel injection device 12 during the one combustion cycle of the engine 2. In this manner, the rotation speed increase mode execution unit 40 increases the rotation speed of the engine 2 over the time.

In S103, the rotation speed increase mode execution unit 40 determines whether or not a first parameter P1 relating to an operation state of the engine 2 reaches a predetermined threshold value Pth in the above-described rotation speed increase mode. Here, for example, the first parameter P1 may be the rotation speed N1 of the engine 2 which is measured by the engine rotation speed meter 32 illustrated in FIG. 1, may be the rotation speed N2 of the turbocharger 16 which is measured by the turbocharger rotation speed meter 34 illustrated in FIG. 1, or may be a fuel energization period (pulse width) of the fuel injection device 12 or the fuel injection amount F recognized by the ECU 4.

In S103, when the above-described first parameter P1 reaches the threshold value Pth, in S104, the high-idle mode execution unit 42 executes the high-idle mode (refer to FIG. 5) which is a mode for operating the engine 2 with no load and which is a mode different from the rotation speed increase mode, over a predetermined period (for example, a period corresponding to a predetermined number of combustion cycles of the engine 2).

Figure 6:
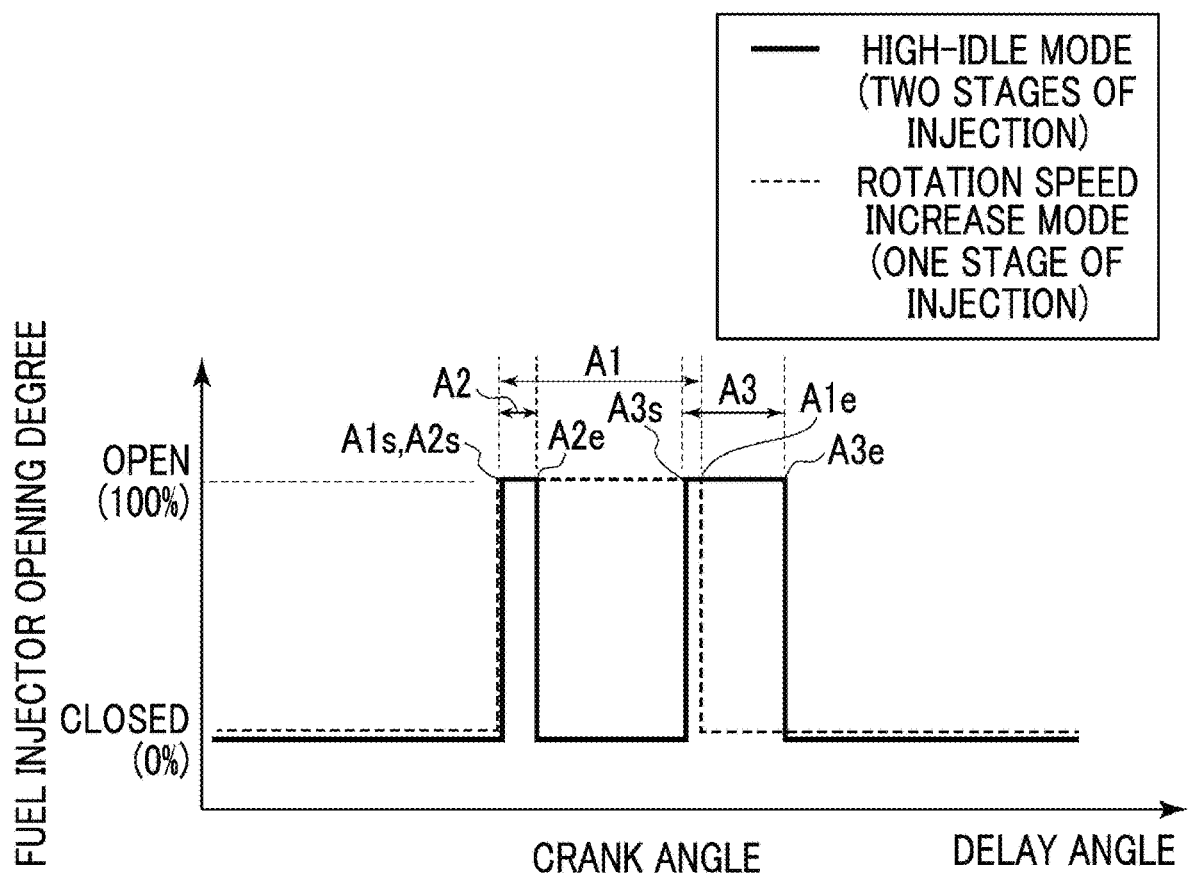
FIG. 6 is a view illustrating a relationship between a crank angle and an opening degree of a fuel injector in one combustion cycle of the engine 2 in each of a high-idle mode and a rotation speed increase mode.

As illustrated in FIG. 5, in the high-idle mode, the high-idle mode execution unit 42 maintains a constant fuel injection amount of the fuel injection device 12 while operating the engine 2 with no load. In this manner, the high-idle mode execution unit 42 maintains a constant rotation speed of the engine 2. As illustrated in FIG. 6, the rotation speed increase mode includes at least one stage (one time) of fuel injection in the one combustion cycle of the engine, and the high-idle mode includes at least two stages (two times) of fuel injection in the one combustion cycle of the engine. The high-idle mode execution unit 42 may control the fuel injection device 12 so that the number of fuel injection stages (number of times) per one combustion cycle of the engine 2 in at least a part of a period in which the high-idle mode is executed is more than the number of fuel injection stages (number of times) per one combustion cycle of the engine in at least a part of a period in which the rotation speed increase mode is executed.

In an example illustrated in FIG. 6, the number of fuel injection stages per one combustion cycle of the engine in the rotation speed increase mode is one, and the number of fuel injection stages per one combustion cycle of the engine 2 in the high-idle mode is two.

In addition, in the example illustrated in FIG. 6, the rotation speed increase mode execution unit 40 controls the fuel injection device 12 to perform fuel injection over a first crank angle range A1 which is a predetermined crank angle range in the one combustion cycle of the engine 2 in the rotation speed increase mode. In addition, in the high-idle mode, the high-idle mode execution unit 42 performs fuel injection over a second crank angle range A2 which is a predetermined crank angle range in the one combustion cycle of the engine, and controls the fuel injection device 12 to perform fuel injection over a third crank angle range A3 separated to a delay angle side with respect to the second crank angle range A2 in the one combustion cycle. In the high-idle mode, the high-idle mode execution unit 42 controls the fuel injection device 12 not to perform fuel injection between an end point A2e of the second crank angle range A2 and a start point A3s of the third crank angle range A3.

In this way, the high-idle mode execution unit 42 is configured to retard a timing of the second stage fuel injection (timing of the start point A3s) in the one combustion cycle of the engine in the high-idle mode, relative to a timing of the first stage fuel injection (timing of the start point A1s in the first crank angle range) in the one combustion cycle of the engine 2 in the rotation speed increase mode. The description "retarding" means shifting the timing in the one combustion cycle of the engine 2 to a delay angle side.

In addition, in the example illustrated in FIG. 6, the high-idle mode execution unit 42 controls the end point A3e of the third crank angle range A3 in the high-idle mode to the delay angle side, relative to the end point A1e of the first crank angle range A1 in the rotation speed increase mode. In addition, in the example illustrated in FIG. 6, the high-idle mode execution unit 42 controls the start point A3s of the third crank angle range A3 in the high-idle mode to an advance angle side, relative to the end point A1e of the first crank angle range A1 in the rotation speed increase mode. In addition, in the example illustrated in FIG. 6, the high-idle mode execution unit 42 controls the fuel injection device 12 so that the end point A2e of the second crank angle range A2 in the high-idle mode is located between the start point A1s and the end point A1e of the first crank angle range A1 in the rotation speed increase mode. However, the end point A2e may not be located between the start point A1s and the end point A1e.

Referring back to FIG. 4, after the high-idle mode is executed, in S105, the load application mode execution unit 44 executes the load application mode which is a mode for applying the load to the engine 2.

As illustrated in FIG. 5, in the load application mode, the fuel injection amount is increased over the time to recover a decreased amount of the rotation speed of the engine 2 which results from the load application to the engine 2. When the rotation speed of the engine 2 reaches a predetermined rotation speed, the fuel injection amount is controlled to be constant. In addition, in the load application mode, each of timings of the second stage fuel injection is changed to the advance angle side over the time. An interval between the first stage fuel injection timing and the second stage fuel injection timing (interval between the timing of the end point A2e and the timing of the start point A3s in FIG. 6) is reduced over the time, and the interval is set as 0. In this manner, the number of stages of fuel injection in the one combustion cycle is changed from two stages to one stage.

(Operational Effect of Control of ECU 4)

Figure 7:
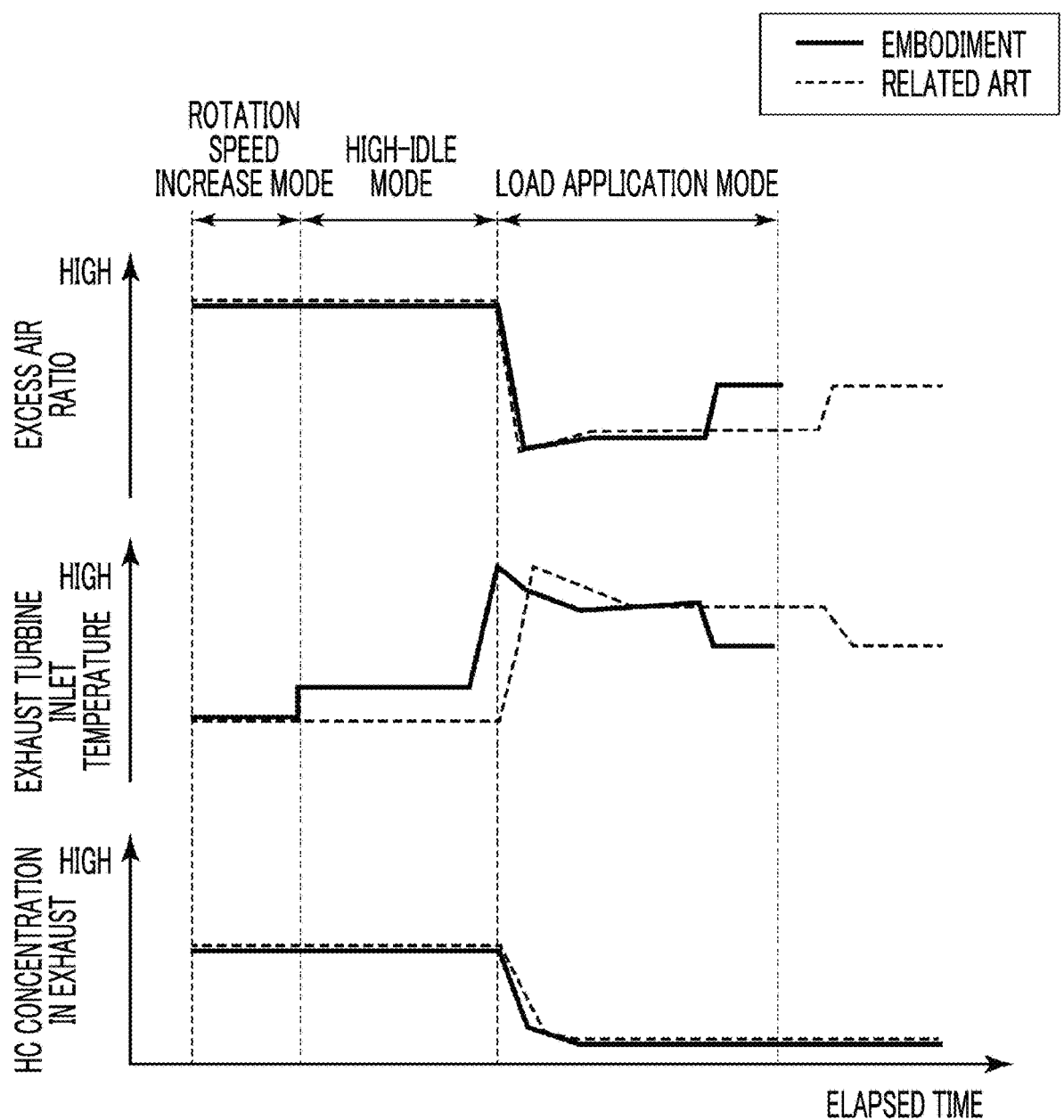
FIG. 7 illustrates a relationship between an elapsed time and an excess air ratio of the engine 2, a relationship between an elapsed time and an exhaust turbine inlet temperature, and a relationship between an elapsed time and a concentration of HC during exhaust of the engine 2.

According to the above-described control, when the first parameter P1 relating to an operation state of the engine 2 reaches the predetermined threshold value Pth in the rotation speed increase mode, the rotation speed increase mode including one stage of fuel injection during one combustion cycle is switched to the high-idle mode including two stages of fuel injection during one combustion cycle. In this manner, a gas temperature (in-cylinder gas temperature) of the combustion chamber 26 of the engine 2 when the second stage fuel injection starts in the high-idle mode rises. Therefore, even in a state where a timing of the second stage fuel injection is retarded, while stable combustion can be realized as illustrated in FIG. 7, the exhaust turbine inlet temperature (in a configuration illustrated in FIG. 1, a temperature between the exhaust valve 30 and the exhaust turbine 16a in the exhaust line 10) can be raised by increasing exhaust energy of the engine, and an inlet air pressure of the engine 2 can be raised as illustrated in FIG. 5. Therefore, as illustrated in FIG. 7, while an increase in a discharge amount of white smoke can be suppressed by suppressing an increase in concentration of HC in exhaust of the engine 2 in the high-idle mode, satisfactory load application performance can be realized.

In addition, the end point A3e of the third crank angle range A3 in the high-idle mode is controlled to a delay angle side, relative to the end point A1e of the first crank angle range A1 in the rotation speed increase mode. In this manner, an exhaust turbine inlet temperature of the turbocharger 16 in the high-idle mode can be effectively raised, and the inlet air pressure of the engine 2 can be effectively raised. Therefore, the load application performance can be effectively improved.

In addition, the start point A3s of the third crank angle range A3 in the high-idle mode is controlled to an advance angle side, relative to A1e of the first crank angle range A1 in the rotation speed increase mode. In this manner, an increase in the concentration of HC in the exhaust of the engine 2 in the high-idle mode can be effectively suppressed.

Figure 8:
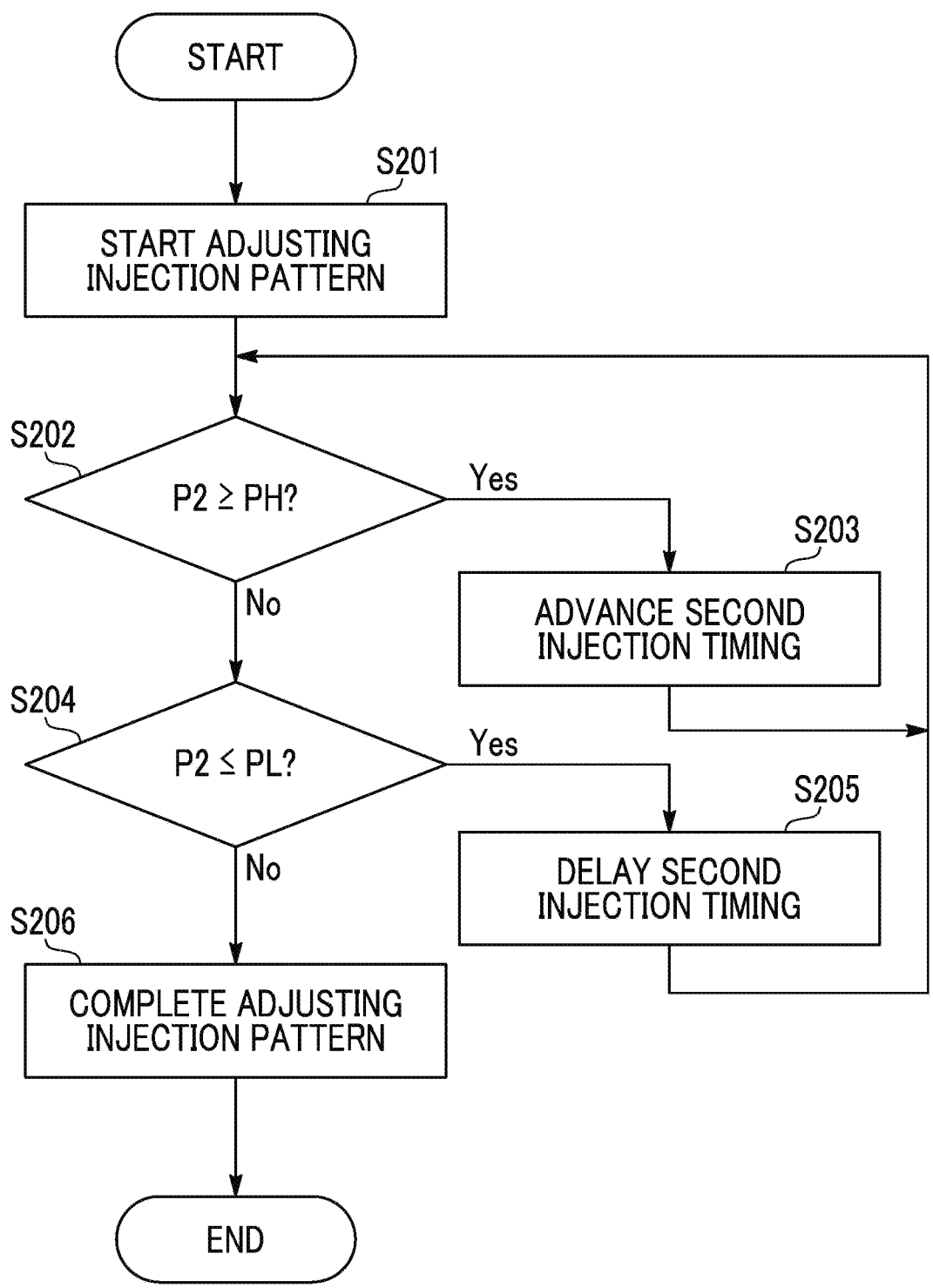
FIG. 8 is a view illustrating an example of a load application flow in which a load is applied to the engine 2 via the high-idle mode by the ECU 4 illustrated in FIG. 3.
Figure 9:
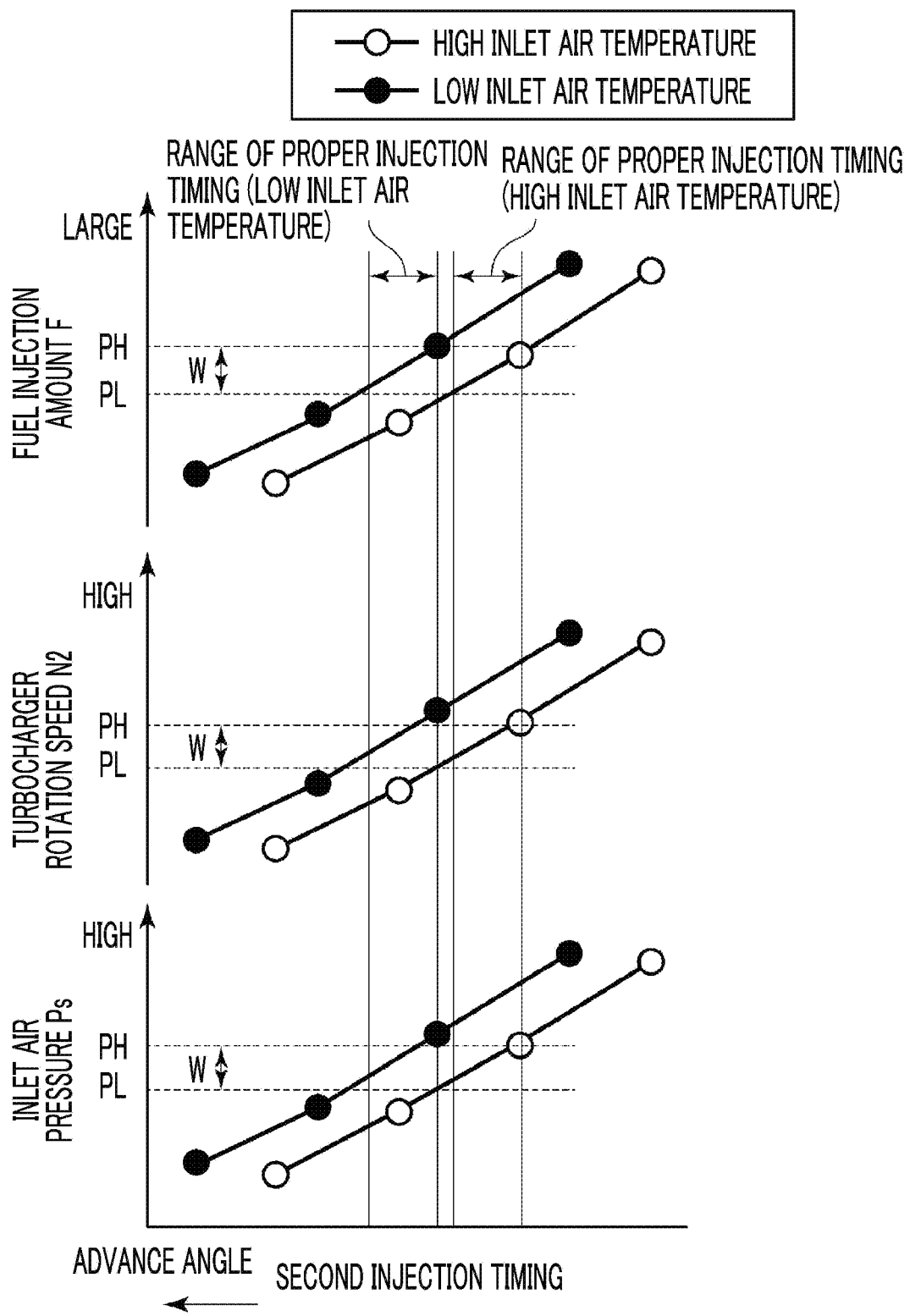
FIG. 9 is a view illustrating a relationship between a second stage fuel injection timing of the engine 2 and a fuel injection amount F, a relationship between the second stage fuel injection timing of the engine 2 and a turbocharger rotation speed N2, and a relationship between the second stage fuel injection timing of the engine 2 and a inlet air pressure Ps of the engine 2, when an inlet air temperature of the engine 2 in a load application flow illustrated in FIG. 8 is high and when the inlet air temperature of the engine 2 is low.

In some embodiments, for example, as illustrated in FIG. 8, the high-idle mode execution unit 42 may adjust a timing (timing of the start point A3s in an example illustrated in FIG. 6) of the second stage fuel injection in the one combustion cycle of the engine 2 in the high-idle mode in a plurality of combustion cycles so that the second parameter P2 relating to an operation state of the engine 2 in the high-idle mode falls within a proper target range W (range where a lower limit is set as PL and an upper limit is set PH in an example illustrated in FIG. 9).

Here, for example, the second parameter P2 may be the rotation speed N2 of the turbocharger 16 which is measured by the turbocharger rotation speed meter 34 illustrated in FIG. 1, may be the inlet air pressure Ps of the engine 2 which is measured by the inlet air pressure sensor 36, and may be the fuel energization period (pulse width) of the fuel injection device 12 or the fuel injection amount F recognized by the ECU 4.

In an example illustrated in FIG. 8, in S201, the high-idle mode execution unit 42 starts adjusting a fuel injection pattern of the fuel injection device 12 in the high-idle mode. In S202, the high-idle mode execution unit 42 determines whether or not the second parameter P2 in the high-idle mode exceeds the upper limit PH of the target range W. In S202, when it is determined that the second parameter P2 exceeds the upper limit PH of the target range W, in S203, the high-idle mode execution unit 42 advances a timing (timing of the start point A3s) of the second stage fuel injection in the one combustion cycle of the engine 2 in the high-idle mode over the plurality of combustion cycles, and returns the process to S202. In S202, when it is determined that the second parameter P2 does not exceed the upper limit PH of the target range W, it is determined in S204 whether or not the second parameter P2 falls below the lower limit PL of the target range W. In S204, when it is determined that the second parameter P2 falls below the lower limit PL of the target range W, in S205, the high-idle mode execution unit 42 delays a timing (timing of the start point A3s) of the second stage fuel injection in the one combustion cycle of the engine 2 in the high-idle mode over the plurality of combustion cycles, and returns the process to S202. In S204, when it is determined that the second parameter P2 does not fall below the lower limit PL of the target range W, the second parameter P2 falls within the target range W, and it is possible to determine that the timing of the second stage fuel injection in the one combustion cycle of the engine 2 in the high-idle mode is optimized. Therefore, the adjustment of the fuel injection pattern of the fuel injection device 12 is completed in S206, and thereafter, a load is applied to the engine 2. In addition, in the above-described load application mode as well, the timing of the fuel injection in the one combustion cycle of the engine 2 in the load application mode may be adjusted in the plurality of combustion cycles so that the second parameter P2 relating to the operation state of the engine 2 falls within a desired proper target range.

Hereinafter, an advantageous effect of the embodiment described with reference to FIG. 8 will be described.

As illustrated in FIG. 9, for example, depending on an inlet air temperature (atmospheric condition) of the engine 2, a timing of the fuel injection corresponding to the proper range W of the operation state (in the illustrated example, the fuel injection amount F, the rotation speed N2 of the turbocharger 16, and the inlet air pressure Ps of the engine 2) of the engine 2 is changed.

Figure 10:
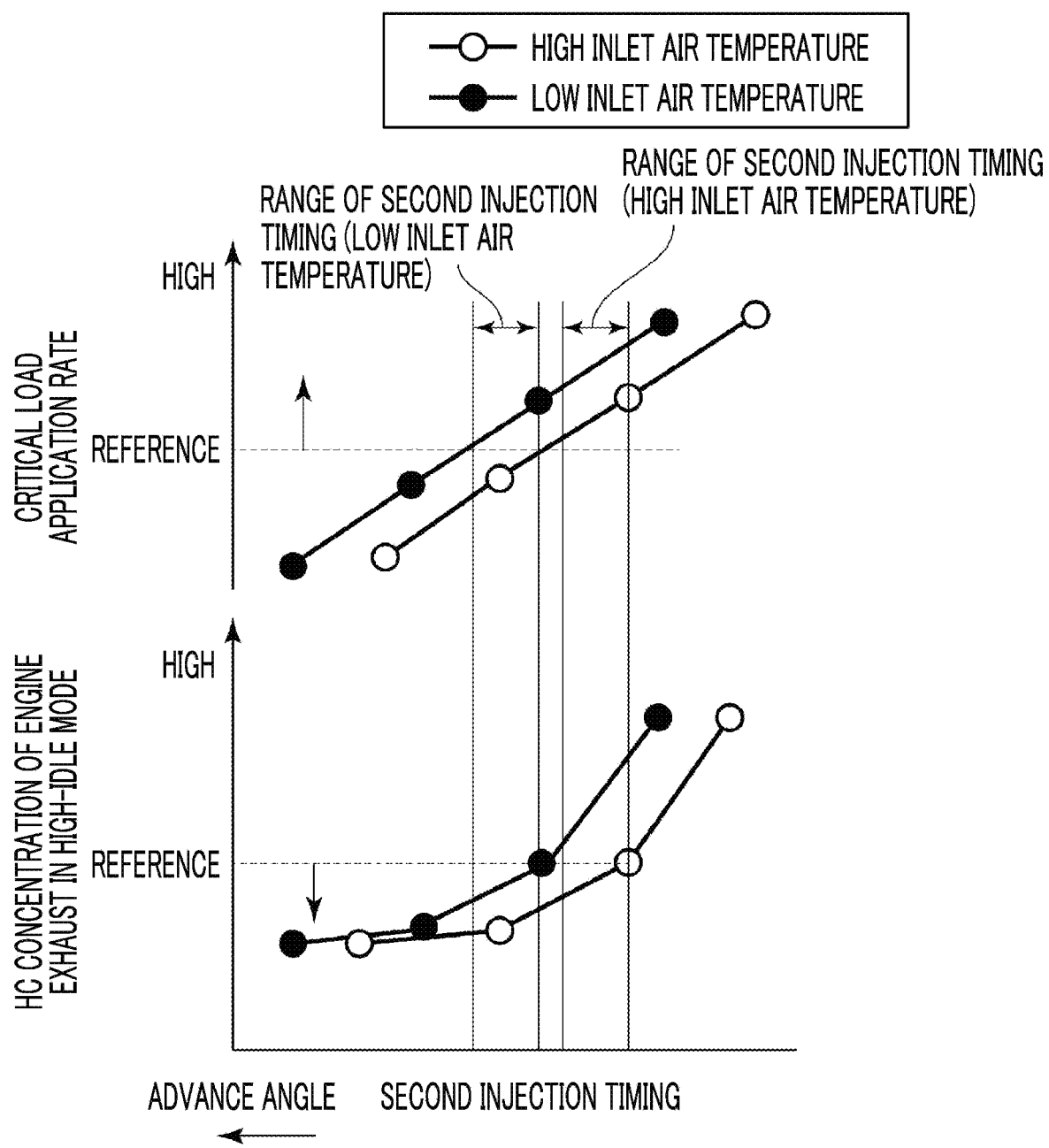
FIG. 10 is a view illustrating a relationship between the second stage fuel injection timing of the engine 2 and a critical load application rate, and a relationship between the second stage fuel injection timing of the engine 2 and a concentration of HC during exhaust of the engine 2 in the high-idle mode, when the inlet air temperature of the engine 2 in the load application flow illustrated in FIG. 8 is high and when the inlet air temperature of the engine 2 is low.

Therefore, as described above, the timing of the second stage fuel injection in the one combustion cycle of the engine 2 is adjusted in the plurality of combustion cycles so that the second parameter P2 relating to the operation state of the engine 2 falls within the desired proper target range W (range where the lower limit is set as PL and the upper limit is set as PH in the example illustrated in FIG. 9). In this manner, in addition to the advantageous effect of the embodiment described with reference to FIGS. 1 to 7, a combustion state of the engine 2 in the high-idle mode can be satisfactorily maintained, regardless of a change in an atmospheric condition (temperature or the like) of the engine 2. In this manner, as illustrated in FIG. 10, regardless of an inlet air temperature of the engine 2, while an increase in the discharge amount of white smoke can be suppressed by maintaining the concentration of HC in the exhaust of the engine 2 in the high-idle mode to a reference level or lower, satisfactory load application performance can be realized by maintaining a critical load application rate to a reference level or higher.

Figure 11:
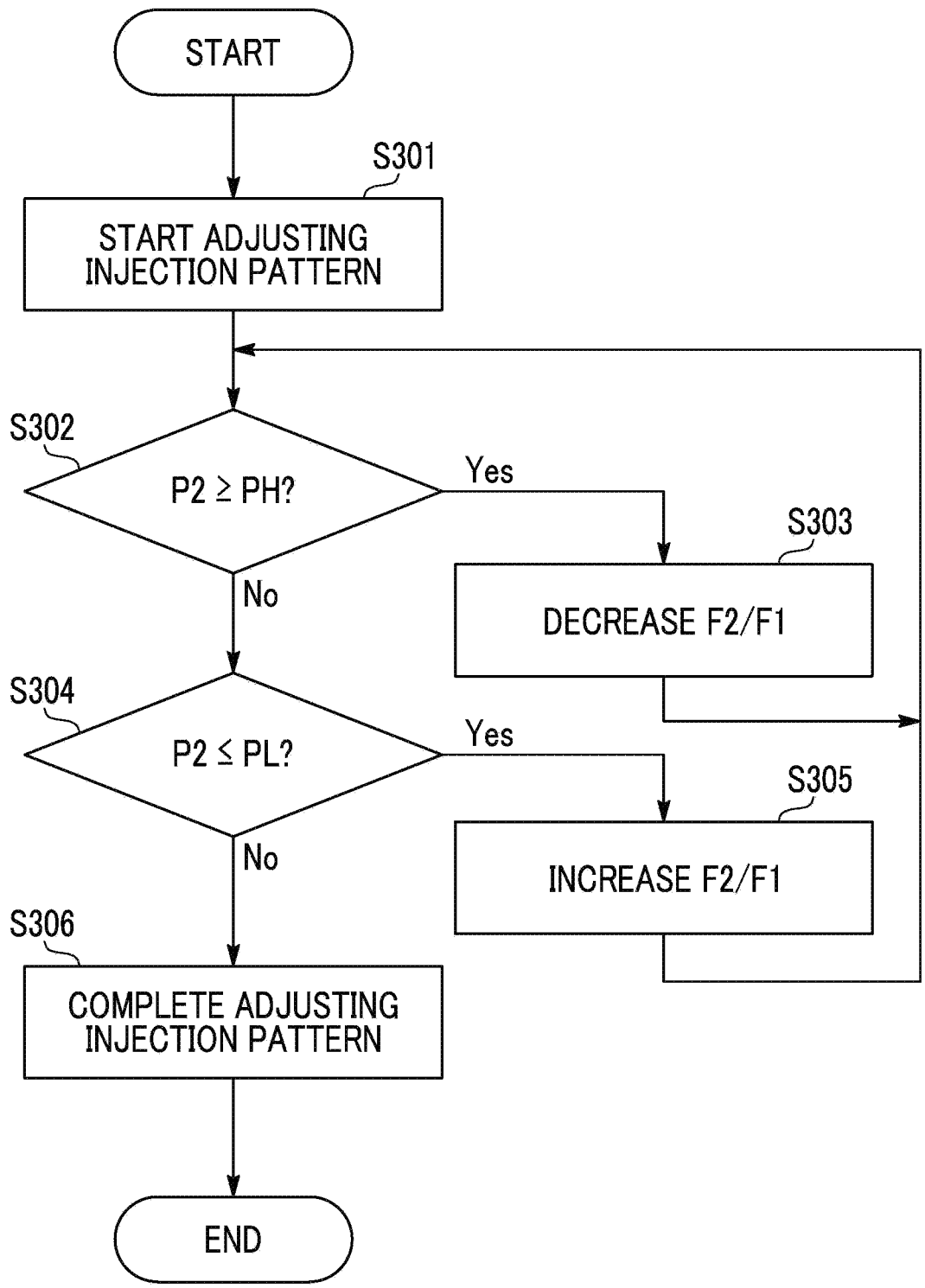
FIG. 11 is a view illustrating an example of the load application flow in which a load is applied to the engine 2 via the high-idle mode executed by the ECU 4 illustrated in FIG. 3.

In some embodiments, for example, as illustrated in FIG. 11, the high-idle mode execution unit 42 may adjust a ratio F2/F1 between a fuel injection amount F1 (fuel injection amount in a period corresponding to the above-described second crank angle range A2) by the first stage fuel injection in the one combustion cycle of the engine 2 in the high-idle mode and a fuel injection amount F2 (fuel injection amount in a period corresponding to the above-described third crank angle range A3) in the second stage fuel injection in the one combustion cycle of the engine 2 in the high-idle mode in a plurality of combustion cycles so that the second parameter P2 relating to the operation state of the engine 2 falls within the desired proper target range W (range where the lower limit is set as PL and the upper limit is set as PH in the example illustrated in FIG. 9).

Here, for example, the second parameter P2 may be the rotation speed N2 of the turbocharger 16 which is measured by the turbocharger rotation speed meter 34 illustrated in FIG. 1, may be the inlet air pressure Ps of the engine 2 which is measured by the inlet air pressure sensor 36, and may be the fuel energization period (pulse width) of the fuel injection device 12 or the fuel injection amount F recognized by the ECU 4.

In an example illustrated in FIG. 11, in S301, the high-idle mode execution unit 42 starts adjusting the fuel injection pattern of the fuel injection device 12 in the high-idle mode. In S302, the high-idle mode execution unit 42 determines whether or not the second parameter P2 exceeds the upper limit PH of the target range W. When it is determined in S302 that the second parameter P2 exceeds the upper limit PH of the target range W, in S303, the high-idle mode execution unit 42 decreases the above-described ratio F2/F1 over the plurality of combustion cycles, and returns the process to S302. In S302, when it is determined that the second parameter P2 does not exceed the upper limit PH of the target range W, it is determined in S304 whether or not the second parameter P2 falls below the lower limit PL of the target range W. In S304, when it is determined that the second parameter P2 falls below the lower limit PL of the target range W, in S305, the high-idle mode execution unit 42 increases the above-described ratio F2/F1 over the plurality of combustion cycles, and returns the process to S301. In S304, when it is determined that the second parameter P2 does not fall below the lower limit PL of the target range W over the plurality of combustion cycles, the second parameter P2 falls within the target range W, and it is possible to determine that the ratio F2/F1 in the one combustion cycle of the engine 2 in the high-idle mode is optimized. Therefore, the adjustment of the fuel injection pattern of the fuel injection device 12 is completed in S306, and thereafter, a load is applied to the engine 2.

Hereinafter, an advantageous effect of the embodiment described with reference to FIG. 11 will be described.

Figure 12:
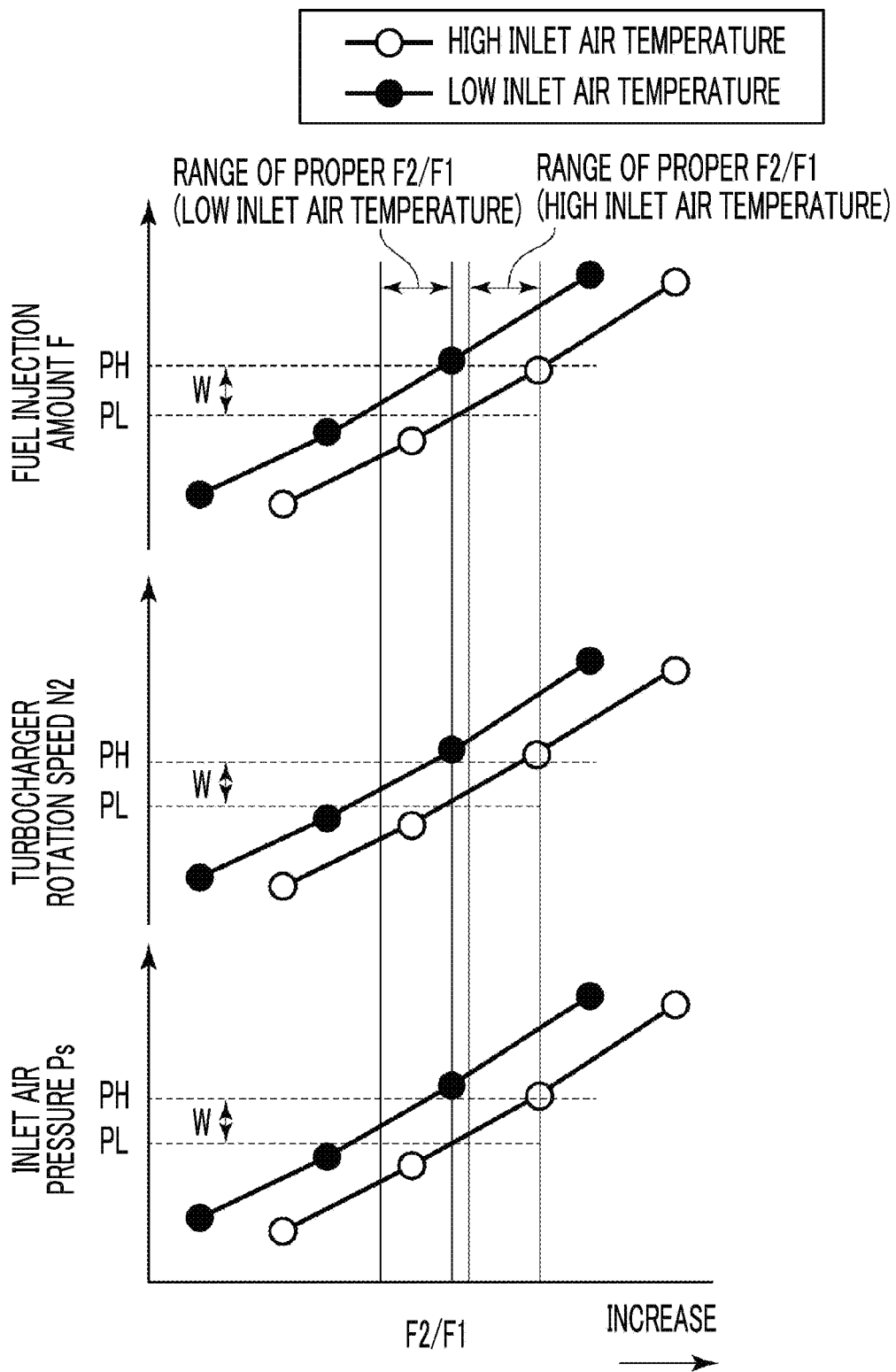
FIG. 12 is a view illustrating a relationship between a ratio F2/F1 (to be described later) and the fuel injection amount F, a relationship between the ratio F2/F1 and the turbocharger rotation speed N2, and a relationship between the ratio F2/F1 and the inlet air pressure Ps of the engine 2, when the inlet air temperature of the engine 2 in the load application flow illustrated in FIG. 11 is high and when the inlet air temperature of the engine 2 is low.

As illustrated in FIG. 12, for example, depending on an inlet air temperature (atmospheric condition) of the engine 2, the above-described ratio F2/F1 corresponding to the proper range W of the operation state (in the illustrated example, the fuel injection amount F, the rotation speed N2 of the turbocharger 16, and the inlet air pressure Ps of the engine 2) of the engine 2 is changed.

Figure 13:
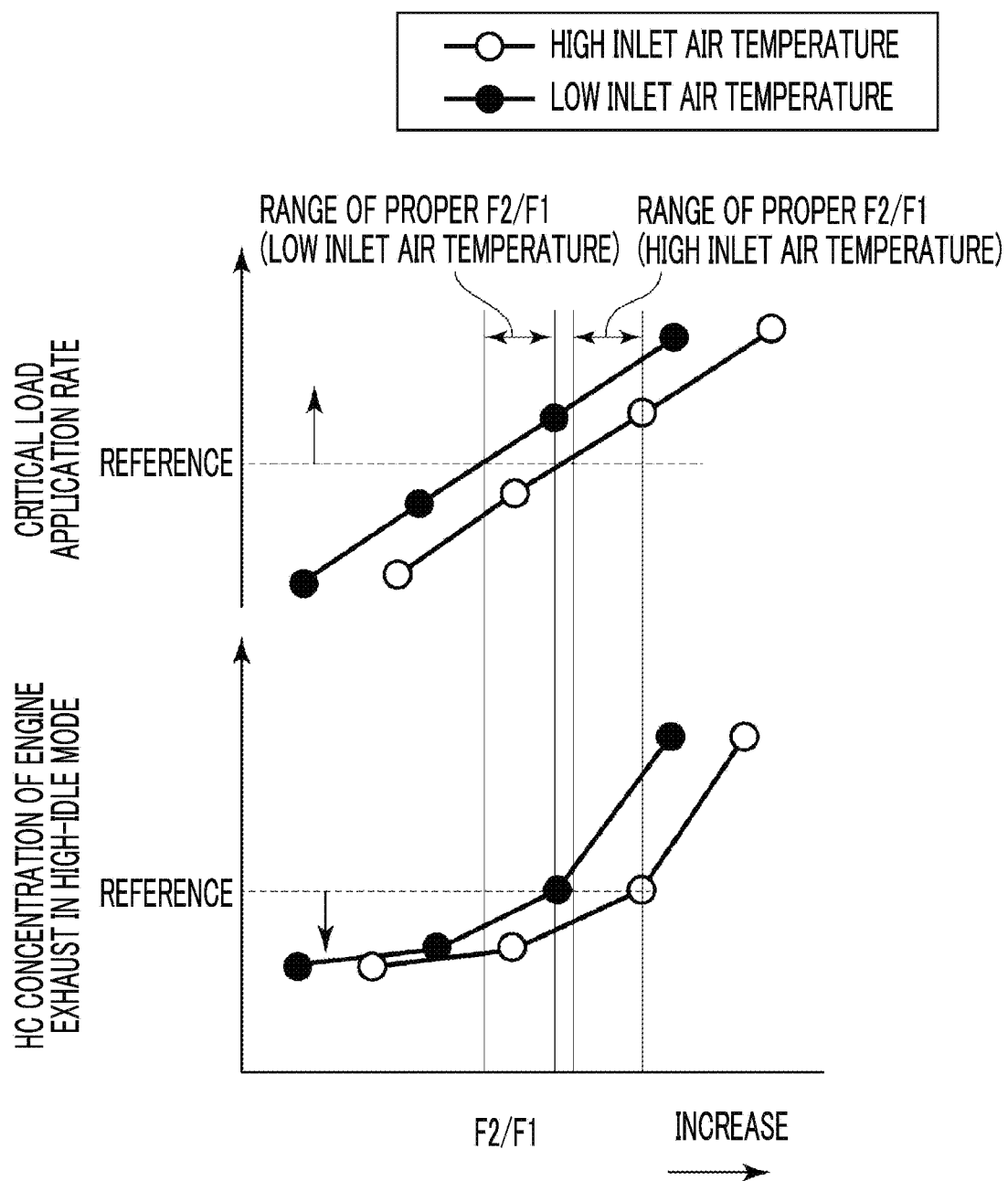
FIG. 13 is a view illustrating a relationship between the ratio F2/F1 (to be described later) and the critical load application rate, and a relationship between the ratio F2/F1 and the concentration of HC during exhaust of the engine 2 in the high-idle mode, when the inlet air temperature of the engine 2 in the load application flow illustrated in FIG. 11 is high and when the inlet air temperature of the engine 2 is low.

Therefore, as described above, the above-described ratio F2/F1 is adjusted in the plurality of combustion cycles so that the second parameter P2 relating to the operation state of the engine 2 falls within the desired proper target range W (range where the lower limit is set as PL and the upper limit is set as PH in the example illustrated in FIG. 11). In this manner, in addition to the advantageous effect of the embodiment described with reference to FIGS. 1 to 7, a combustion state of the engine 2 in the high-idle mode can be satisfactorily maintained, regardless of a change in the atmospheric condition (temperature or the like) of the engine 2. In this manner, as illustrated in FIG. 13, regardless of the atmospheric condition of the engine 2, while an increase in the discharge amount of white smoke can be suppressed by maintaining the concentration of HC in the exhaust of the engine 2 in the high-idle mode to a reference level or lower, satisfactory load application performance can be realized by maintaining a critical load application rate to a reference level or higher.

The present disclosure is not limited to the above-described embodiments, and also includes a form in which modifications are added to the above-described embodiments or a form in which the embodiments are combined with each other as appropriate.

In some of the above-described embodiments, control for performing two stages of fuel injection in the one combustion cycle of the engine 2 in the high-idle mode has been described as an example. However, in another embodiment, the number of stages of fuel injection may be one in the one combustion cycle of the engine 2 in the high-idle mode. In this case, as described below, the high-idle mode execution unit 42 adjusts the timing of the fuel injection in the one combustion cycle of the engine 2 in the high-idle mode so that the second parameter P2 relating to the operation state of the engine 2 falls within the target range W. In this manner, while an increase in the discharge amount of white smoke can be suppressed by suppressing an increase in the concentration of HC in the exhaust of the engine 2 in the high-idle mode, satisfactory load application performance can be realized.

Figure 14:
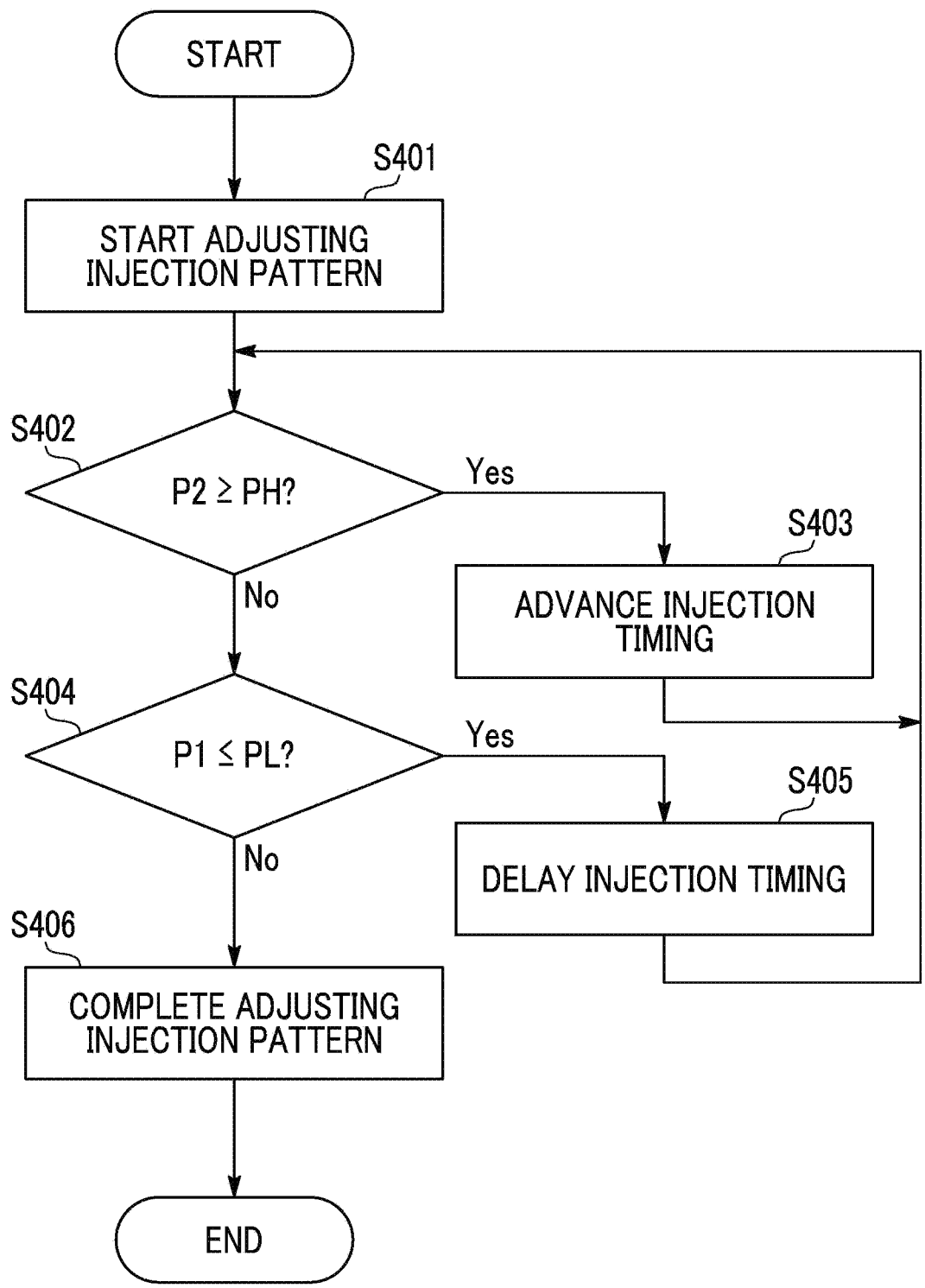
FIG. 14 is a view illustrating an example of the load application flow in which the load is applied to the engine 2 via the high-idle mode executed by the ECU 4 illustrated in FIG. 3.

FIG. 14 is a view illustrating an example of a fuel injection control flow when the number of stages of fuel injection in the one combustion cycle of the engine 2 is one in the high-idle mode.

In some embodiments, for example, as illustrated in FIG. 14, the high-idle mode execution unit 42 mat adjust the timing of the fuel injection in the one combustion cycle of the engine 2 in the high-idle mode in the plurality of combustion cycles so that the second parameter P2 relating to the operation state of the engine 2 falls within the desired proper target range W (range where the lower limit is set as PL and the upper limit is set as PH in the example illustrated in FIG. 14).

Here, for example, the second parameter P2 may be the rotation speed N2 of the turbocharger 16 which is measured by the turbocharger rotation speed meter 34 illustrated in FIG. 1, may be the inlet air pressure Ps of the engine 2 which is measured by the inlet air pressure sensor 36, and may be the fuel energization period (pulse width) of the fuel injection device 12 or the fuel injection amount F recognized by the ECU 4.

In an example illustrated in FIG. 14, in S401, the high-idle mode execution unit 42 starts adjusting the fuel injection pattern of the fuel injection device 12 in the high-idle mode. In S402, the high-idle mode execution unit 42 determines whether or not the second parameter P2 exceeds the upper limit PH of the target range W. When it is determined in S402 that the second parameter P2 exceeds the upper limit PH of the target range W, in S403, the high-idle mode execution unit 42 advances the timing of the fuel injection in the one combustion cycle of the engine in the high-idle mode, and returns the process to S402. In S402, when it is determined that the second parameter P2 does not exceed the upper limit PH of the target range W, it is determined in S404 whether or not the second parameter P2 falls below the lower limit PL of the target range W. In S404, when it is determined that the second parameter P2 falls below the lower limit PL of the target range W, in S405, the high-idle mode execution unit 42 delays the timing of the fuel injection in the one combustion cycle of the engine 2 in the high-idle mode, and returns the process to S402. In S404, when it is determined that the second parameter P2 does not fall below the lower limit PL of the target range W over the plurality of combustion cycles, the second parameter P2 falls within the target range W. In a state where the timing of the fuel injection in the one combustion cycle of the engine 2 in the high-idle mode is optimized, the load application mode execution unit 44 executes the load application mode in S406. In addition, in the load application mode as well, as in S402 to S405 described above, the timing of the fuel injection in the one combustion cycle of the engine 2 in the load application mode may be adjusted in the plurality of combustion cycles so that the second parameter P2 relating to the operation state of the engine 2 falls within the desired proper target range.

According to the control illustrated in FIG. 14, for the same reason as that of the control illustrated in FIG. 8, a combustion state of the engine in the high-idle mode can be satisfactorily maintained, regardless of a change in the atmospheric condition (temperature or the like) of the engine 2. In this manner, regardless of the atmospheric condition of the engine 2, while an increase in the discharge amount of white smoke can be suppressed by maintaining the concentration of HC in the exhaust of the engine 2 in the high-idle mode to a reference level or lower, satisfactory load application performance can be realized by maintaining a critical load application rate to a reference level or higher.

For example, contents described in each of the above-described embodiments are understood as follows.

(1) According to at least one embodiment of the present disclosure, there is provided an engine control device (for example, the above-described ECU 4).

An engine control device for controlling an engine with a turbocharger (for example, the above-described diesel engine with the turbocharger 2) includes a rotation speed increase mode execution unit (for example, the above-described rotation speed increase mode execution unit 40) configured to execute a rotation speed increase mode which is a mode for increasing a rotation speed of the engine while operating the engine with no load, a high-idle mode execution unit (for example, the above-described high-idle mode execution unit 42) configured to execute a high-idle mode for operating the engine with no load, which is different from the rotation speed increase mode, when a first parameter (for example, the above-described first parameter P1) relating to an operation state of the engine reaches a threshold value (for example, the above-described threshold value Pth) in the rotation speed increase mode, and a load application mode execution unit (for example, the above-described load application mode execution unit 44) configured to execute a load application mode which is a mode for applying a load to the engine, after the high-idle mode is executed.

The rotation speed increase mode includes at least one stage of fuel injection in one combustion cycle of the engine.

The high-idle mode includes at least two stages of fuel injection in the one combustion cycle of the engine.

The high-idle mode execution unit is configured to retard a timing (for example, the timing of the above-described start point A3s) of second stage fuel injection in the one combustion cycle of the engine in the high-idle mode, relative to a timing (for example, the timing of the above-described start point A1s) of first stage fuel injection in the one combustion cycle of the engine in the rotation speed increase mode.

According to the engine control device described in (1) above, when the first parameter relating to the operation state of the engine reaches the threshold value in the rotation speed increase mode, the rotation speed increase mode including one stage of fuel injection during one combustion cycle is switched to the high-idle mode including two stages of fuel injection during one combustion cycle. In this manner, the gas temperature (in-cylinder gas temperature) in the combustion chamber of the engine when the second stage fuel injection starts in the high-idle mode rises. Therefore, even in a state where a timing of the second stage fuel injection is retarded, while stable combustion can be realized, an exhaust turbine inlet temperature of the turbocharger can be raised by increasing exhaust energy of the engine, and the inlet air pressure of the engine can be raised. Therefore, while an increase in the discharge amount of white smoke can be suppressed by suppressing an increase in the concentration of HC in the exhaust of the engine in the high-idle mode, satisfactory load application performance can be realized.

(2) In some embodiments, in the engine control device described in (1) above, in the rotation speed increase mode, the rotation speed increase mode execution unit is configured to perform fuel injection over a first crank angle range (for example, the above-described first crank angle range A1) in the one combustion cycle of the engine, and in the high-idle mode, the high-idle mode execution unit is configured to perform fuel injection over a second crank angle range (for example, the above-described second crank angle range A2) in the one combustion cycle of the engine, and to perform fuel injection over a third crank angle range (for example, the above-described third crank angle range A3) separated to a delay angle side with respect to the second crank angle range in the one combustion cycle.

The high-idle mode execution unit is configured to control an end point (for example, the above-described end point A3e) of the third crank angle range in the high-idle mode to a delay angle side, relative to an end point (for example, the above-described end point A1e) of the first crank angle range in the rotation speed increase mode.

According to the engine control device described in (2) above, the end point of the third crank angle range in the high-idle mode is controlled to the delay angle side, relative to the end point of the first crank angle range in the rotation speed increase mode. In this manner, the exhaust turbine inlet temperature of the turbocharger in the idle mode can be effectively raised, and the inlet air pressure of the engine can be effectively raised. Therefore, the load application performance can be effectively improved.

(3) In some embodiments, in the engine control device described in (2) above, the high-idle mode execution unit is configured to control a start point (for example, the above-described start point A3s) of the third crank angle range in the high-idle mode to an advance angle side, relative to an end point (for example, the above-described end point A1e) of the first crank angle range in the rotation speed increase mode.

According to the engine control device described in (3) above, the start point of the third crank angle range in the high-idle mode is controlled to the advance angle side, relative to the end point of the first crank angle range in the rotation speed increase mode. In this manner, an increase in the concentration of HC in the exhaust of the engine in the high-idle mode can be suppressed.

(4) In some embodiments, in the engine control device described in any one of (1) to (3) above, the first parameter is the rotation speed (for example, the above-described rotation speed N1) of the engine, a fuel injection amount (for example, the above-described fuel injection amount F) of the engine, or a rotation speed (for example, the above-described rotation speed N2) of the turbocharger.

According to the engine control device described in (4) above, the high-idle mode can be executed when the rotation speed of the engine, the fuel injection amount of the engine, or the rotation speed of the turbocharger reaches a threshold value.

(5) In some embodiments, in the engine control device described in any one of (1) to (4) above, the high-idle mode execution unit is configured to adjust a timing (for example, the above-described timing of the start point A3s) of the second stage fuel injection in the one combustion cycle of the engine in the high-idle mode so that a second parameter (for example, the above-described second parameter P2) relating to the operation state of the engine falls within a target range (for example, the above-described target range W).

Depending on the atmospheric condition such as the inlet air temperature of the engine, the timing of fuel injection for achieving a proper operation state of the engine is changed. Therefore, as described in (5) above, the timing of the second stage fuel injection in the one combustion cycle of the engine is adjusted so that the second parameter relating to the operation state of the engine falls within the desired proper target range. In this manner, regardless of a change in the atmospheric condition of the engine, a combustion state of the engine in the high-idle mode can be satisfactorily maintained. In this manner, regardless of the atmospheric condition of the engine, while an increase in the concentration of HC in the exhaust of the engine in the high-idle mode can be suppressed, satisfactory load application performance can be realized.

(6) In some embodiments, in the engine control device described in any one of (1) to (4) above, the high-idle mode execution unit is configured to adjust a ratio (for example, the above-described ratio F2/F1) between a fuel injection amount of the first stage fuel injection in the one combustion cycle in the high-idle mode and a fuel injection amount of the second stage fuel injection in the one combustion cycle of the engine in the high-idle mode the engine in the high-idle mode so that a second parameter (for example, the above-described second parameter P2) relating to the operation state of the engine falls within a target range (for example, the above-described target range W).

Depending on the atmospheric condition such as the inlet air temperature of the engine, the ratio F2/F1 that can realize a proper operation state of the engine is changed. Therefore, as described in (6) above, the ratio F2/F1 is adjusted so that the second parameter relating to the operation state of the engine falls within the desired proper target range. In this manner, regardless of a change in the atmospheric condition (temperature or the like) of the engine, a combustion state of the engine in the high-idle mode can be satisfactorily maintained. In this manner, regardless of the atmospheric condition of the engine, while an increase in the concentration of HC in the exhaust of the engine in the high-idle mode can be suppressed, satisfactory load application performance can be realized.

(7) In some embodiments, in the engine control device described in (5) above, the second parameter is a fuel injection amount (for example, the above-described fuel injection amount F) of the engine, a rotation speed (for example, the above-described rotation speed N2) of the turbocharger, or an inlet air pressure (for example, the above-described inlet air pressure Ps) of the engine.

When the second parameter exceeds an upper limit (for example, the above-described upper limit PH) of the target range, the high-idle mode execution unit advances a timing of the second stage fuel injection in the one combustion cycle of the engine in the high-idle mode, and when the second parameter falls below a lower limit (for example, the above-described lower limit PL) of the target range, he high-idle mode execution unit delays the timing of the second stage fuel injection in the one combustion cycle of the engine in the high-idle mode.

Depending on the atmospheric condition such as the inlet air temperature of the engine, the timing of fuel injection for achieving a proper operation state of the engine is changed. Therefore, as described in (7) above, the timing of the second stage fuel injection in the one combustion cycle of the engine is properly adjusted so that the fuel injection amount of the engine, the rotation speed of the turbocharger, or the inlet air pressure of the engine falls within the desired proper target range. In this manner, regardless of a change in the atmospheric condition of the engine, a combustion state of the engine in the high-idle mode can be satisfactorily maintained. In this manner, regardless of the atmospheric condition of the engine, while an increase in the concentration of HC in the exhaust of the engine in the high-idle mode can be suppressed, satisfactory load application performance can be realized.

(8) In some embodiments, in the engine control device described in (6) above, the second parameter is a fuel injection amount (for example, the above-described fuel injection amount F) of the engine, a rotation speed (for example, the above-described rotation speed N2) of the turbocharger, or an inlet air pressure (for example, the above-described inlet air pressure Ps) of the engine.

When the second parameter exceeds an upper limit of the target range, the high-idle mode execution unit is configured to decrease a ratio F2/F1 between a fuel injection amount F1 of the first stage fuel injection in the one combustion cycle of the engine in the high-idle mode and a fuel injection amount F2 of the second stage fuel injection in the one combustion cycle of the engine in the high-idle mode, and when the second parameter falls below a lower limit of the target range, the high-idle mode execution unit is configured to increase the ratio F2/F1.

Depending on the atmospheric condition such as the inlet air temperature of the engine, the ratio F2/F1 that realizes a proper operation state of the engine is changed. Therefore, as described in (8) above, the above-described ratio (F2/F1) is properly adjusted so that the fuel injection amount of the engine, the rotation speed of the turbocharger, or the inlet air pressure of the engine falls within the desired proper target range. In this manner, regardless of a change in the atmospheric condition of the engine, a combustion state of the engine in the high-idle mode can be satisfactorily maintained. In this manner, regardless of the atmospheric condition of the engine, while an increase in the concentration of HC in the exhaust of the engine in the high-idle mode can be suppressed, satisfactory load application performance can be realized.

(9) In some embodiments, in the engine control device described in any one of (5) to (8) above, when the second parameter relating to the operation state of the engine falls within the target range, the load application mode execution unit is configured to execute the load application mode.

According to the engine control device described in (9) above, a load can be applied to the engine in a proper operation state of the engine which can achieve both suppressing an increase in the concentration of HC in the exhaust and high load application performance.

Whether or not the engine is in the proper operation state when the load is applied can be determined, based on the fuel injection amount of the engine, the rotation speed of the turbocharger, or the inlet air pressure of the engine.

(10) According to at least one embodiment of the present disclosure, there is provided an engine control method.

An engine control method for controlling an engine with a turbocharger (for example, the above-described diesel engine with the turbocharger 2) includes a rotation speed increase mode execution step of executing a rotation speed increase mode which is a mode for increasing a rotation speed of the engine while operating the engine with no load, a high-idle mode execution step of executing a high-idle mode for operating the engine with no load, which is different from the rotation speed increase mode, when a first parameter relating to an operation state of the engine reaches a threshold value in the rotation speed increase mode, and a load application mode execution step of executing a load application mode which is a mode for applying a load to the engine, after the high-idle mode is executed.

The rotation speed increase mode includes at least one stage of fuel injection in one combustion cycle of the engine.

The high-idle mode includes at least two stages of fuel injection in the one combustion cycle of the engine.

In the high-idle mode execution step, the timing of the second stage fuel injection (for example, the above-described timing of the start point A3s) in the one combustion cycle of the engine in the high-idle mode is retarded, relative to the timing of the first stage fuel injection (for example, the above-described timing of the start point A1s) in the one combustion cycle of the engine in the rotation speed increase mode.

According to the engine control method described in (10) above, when the first parameter relating to the operation state of the engine reaches the threshold value in the rotation speed increase mode, the rotation speed increase mode including one stage of fuel injection during one combustion cycle is switched to a high-idle mode including two stages of fuel injection during one combustion cycle. In this manner, the gas temperature (in-cylinder gas temperature) in the combustion chamber of the engine when the second stage fuel injection starts in the high-idle mode rises. Therefore, even in a state where a timing of the second stage fuel injection is retarded, while stable combustion can be realized, an exhaust turbine inlet temperature of the turbocharger can be raised by increasing exhaust energy of the engine, and the inlet air pressure of the engine can be raised. Therefore, while an increase in the discharge amount of white smoke can be suppressed by suppressing an increase in the concentration of HC in the exhaust of the engine in the high-idle mode, satisfactory load application performance can be realized.

(11) According to at least one embodiment of the present disclosure, there is provided an engine control device (for example, the above-described ECU 4).

An engine control device for controlling an engine with a turbocharger (for example, the above-described diesel engine with the turbocharger 2) includes a rotation speed increase mode execution unit (for example, the above-described rotation speed increase mode execution unit 40) configured to execute a rotation speed increase mode which is a mode for increasing a rotation speed of the engine while operating the engine with no load, a high-idle mode execution unit (for example, the above-described high-idle mode execution unit 42) configured to execute a high-idle mode for operating the engine with no load, which is different from the rotation speed increase mode, when a first parameter (for example, the above-described first parameter P1) relating to an operation state of the engine reaches a threshold value (for example, the above-described threshold value Pth) in the rotation speed increase mode, and a load application mode execution unit (for example, the above-described load application mode execution unit 44) configured to execute a load application mode which is a mode for applying a load to the engine, after the high-idle mode is executed.

The high-idle mode execution unit is configured to adjust a timing of fuel injection in one combustion cycle of the engine in the high-idle mode so that a second parameter relating to an operation state of the engine falls within a target range.

Depending on the atmospheric condition such as the inlet air temperature of the engine, the timing of fuel injection for achieving a proper operation state of the engine is changed. Therefore, as described in (11) above, the timing of the fuel injection in the one combustion cycle of the engine is properly adjusted so that the second parameter relating to the operation state of the engine falls within the desired proper target range. In this manner, regardless of a change in the atmospheric condition of the engine, a combustion state of the engine in the high-idle mode can be satisfactorily maintained. In this manner, regardless of the atmospheric condition of the engine, while an increase in the concentration of HC in the exhaust of the engine in the high-idle mode can be suppressed, satisfactory load application performance can be realized.

REFERENCE SIGNS LIST

2: Diesel engine with turbocharger (engine)
4: ECU
6: Engine body
8: Inlet line
10: Exhaust line
12: Fuel injection device
14: Fuel injection command
16: Turbocharger
16a: Exhaust turbine
16b: Compressor
18: Intercooler
19: Throttle valve
20: Cylinder
22: Piston
23: Connecting rod
25: Generator
26: Combustion chamber
28: Inlet valve
30: Exhaust valve
32: Engine rotation speed meter
34: Turbocharger rotation speed meter
35: Inlet air temperature sensor
36: Inlet air pressure sensor
38: Load application command receiving unit
40: Rotation speed increase mode execution unit
42: High-idle mode execution unit
44: Load application mode execution unit
46: Storage unit
72: Processor
74: RAM
76: ROM
78: HDD
80: Input I/F
82: Output I/F
84: Bus
100: Diesel engine system

The invention claimed is:

1. An engine control device for controlling an engine with a turbocharger, the device comprising:
   a rotation speed increase mode execution unit configured to execute a rotation speed increase mode which is a mode for increasing a rotation speed of the engine while operating the engine with no load;
   a high-idle mode execution unit configured to execute a high-idle mode for operating the engine with no load, which is different from the rotation speed increase mode, when a first parameter relating to an operation state of the engine reaches a threshold value in the rotation speed increase mode; and
   a load application mode execution unit configured to execute a load application mode which is a mode for applying a load to the engine, after the high-idle mode is executed,
   wherein the rotation speed increase mode includes at least one stage of fuel injection in one combustion cycle of the engine,
   the high-idle mode includes at least two stages of fuel injection in the one combustion cycle of the engine, and
   the high-idle mode execution unit is configured to retard a timing of second stage fuel injection in the one combustion cycle of the engine in the high-idle mode, relative to a timing of first stage fuel injection in the one combustion cycle of the engine in the rotation speed increase mode.

2. The engine control device according to claim 1, wherein the first parameter is the rotation speed of the engine, a fuel injection amount of the engine, or a rotation speed of the turbocharger.

3. The engine control device according to claim 1,
wherein in the rotation speed increase mode, the rotation speed increase mode execution unit is configured to perform fuel injection over a first crank angle range in the one combustion cycle of the engine,
in the high-idle mode, the high-idle mode execution unit is configured to perform fuel injection over a second crank angle range in the one combustion cycle of the engine, and to perform fuel injection over a third crank angle range separated to a delay angle side with respect to the second crank angle range in the one combustion cycle, and
the high-idle mode execution unit is configured to control an end point of the third crank angle range in the high-idle mode to a delay angle side with respect to an end point of the first crank angle range in the rotation speed increase mode.

4. The engine control device according to claim 3,
wherein the high-idle mode execution unit is configured to control a start point of the third crank angle range in the high-idle mode to an advance angle side with respect to the end point of the first crank angle range in the rotation speed increase mode.

5. The engine control device according to claim 1,
wherein the high-idle mode execution unit is configured to adjust a ratio between a fuel injection amount of the first stage fuel injection in the one combustion cycle of the engine in the high-idle mode and a fuel injection amount of the second stage fuel injection in the one combustion cycle of the engine in the high-idle mode so that a second parameter relating to the operation state of the engine falls within a target range.

6. The engine control device according to claim 5,
wherein the second parameter is a fuel injection amount of the engine, a rotation speed of the turbocharger, or an inlet air pressure of the engine, and
when the second parameter exceeds an upper limit of the target range, the high-idle mode execution unit is configured to decrease a ratio $F2/F1$ between a fuel injection amount $F1$ of the first stage fuel injection in the one combustion cycle of the engine in the high-idle mode and a fuel injection amount $F2$ of the second stage fuel injection in the one combustion cycle of the engine in the high-idle mode, and when the second parameter falls below a lower limit of the target range, the high-idle mode execution unit is configured to increase the ratio $F2/F1$.

7. The engine control device according to claim 1,
wherein the high-idle mode execution unit is configured to adjust a timing of the second stage fuel injection in the one combustion cycle of the engine in the high-idle mode so that a second parameter relating to the operation state of the engine falls within a target range.

8. The engine control device according to claim 7,
wherein the second parameter is a fuel injection amount of the engine, a rotation speed of the turbocharger, or an inlet air pressure of the engine, and
when the second parameter exceeds an upper limit of the target range, the high-idle mode execution unit advances a timing of the second stage fuel injection in the one combustion cycle of the engine in the high-idle mode, and when the second parameter falls below a lower limit of the target range, the high-idle mode execution unit delays the timing of the second stage fuel injection in the one combustion cycle of the engine in the high-idle mode.

9. The engine control device according to claim 7,
wherein in a state where the second parameter relating to the operation state of the engine falls within the target range, the load application mode execution unit is configured to execute the load application mode.

10. An engine control method for controlling an engine with a turbocharger, the method comprising:
a rotation speed increase mode execution step of executing a rotation speed increase mode which is a mode for increasing a rotation speed of the engine while operating the engine with no load;
a high-idle mode execution step of executing a high-idle mode for operating the engine with no load, which is different from the rotation speed increase mode, when a first parameter relating to an operation state of the engine reaches a threshold value in the rotation speed increase mode; and
a load application mode execution step of executing a load application mode which is a mode for applying a load to the engine, after the high-idle mode is executed,
wherein the rotation speed increase mode includes at least one stage of fuel injection in one combustion cycle of the engine,
the high-idle mode includes at least two stages of fuel injection in the one combustion cycle of the engine, and
in the high-idle mode execution step, a timing of second stage fuel injection in the one combustion cycle of the engine in the high-idle mode is retarded, relative to a timing of first stage fuel injection in the one combustion cycle of the engine in the rotation speed increase mode.

11. An engine control device for controlling an engine with a turbocharger, the device comprising:
a rotation speed increase mode execution unit configured to execute a rotation speed increase mode which is a mode for increasing a rotation speed of the engine while operating the engine with no load; a high-idle mode execution unit configured to execute a high-idle mode for operating the engine with no load, which is different from the rotation speed increase mode, when a first parameter relating to an operation state of the engine reaches a threshold value in the rotation speed increase mode; and
a load application mode execution unit configured to execute a load application mode which is a mode for applying a load to the engine, after the high-idle mode is executed,
wherein the high-idle mode execution unit is configured to adjust a timing of fuel injection in one combustion cycle of the engine in the high-idle mode so that a second parameter relating to the operation state of the engine falls within a target range, and
wherein the high-idle mode execution unit is configured;
when the second parameter exceeds an upper limit PH of the target range, to advance the timing of the fuel injection in the one combustion cycle of the engine in the high-idle mode,
when the second parameter falls below a lower limit of the target range, to delay the timing of the fuel injection in the one combustion cycle of the engine in the high-idle mode.

* * * * *